(12) United States Patent
Shah (10) Patent No.: US 8,026,967 B2
(45) Date of Patent: *Sep. 27, 2011

(54) ROLLING SHUTTER FOR PREVENTION OF BLOOMING

(75) Inventor: Joey Shah, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/603,759

(22) Filed: Oct. 22, 2009

(65) Prior Publication Data

US 2010/0039542 A1      Feb. 18, 2010

Related U.S. Application Data

(63) Continuation of application No. 11/114,094, filed on Apr. 26, 2005, now Pat. No. 7,619,670.

(51) Int. Cl.
*H04N 3/14* (2006.01)

(52) U.S. Cl. ........................................ 348/296; 348/308
(58) Field of Classification Search .................. 348/294, 348/296, 297, 300–302, 308
See application file for complete search history.

(56) References Cited

U.S. PATENT DOCUMENTS

| 6,809,766 B1 | 10/2004 | Krymski et al. | 348/296 |
| 2002/0175269 A1 | 11/2002 | Krymski | 250/208.1 |

*Primary Examiner* — Timothy J Henn
(74) *Attorney, Agent, or Firm* — Dickstein Shapiro LLP (57) ABSTRACT

A rolling shutter technique for a pixel array is described in which multiple rows of the array are hard reset as the shutter moves down the array. As the rolling shutter progresses down the array, each row is hard reset multiple times before its integration period begins, thereby ensuring that the row is in a true hard reset condition at the beginning of its integration period. Also, multiple rows are hard reset in advance of the beginning of the integration period for a given row, thereby making it less likely that overexposed pixels several rows away will be able to distort the integrating row by blooming.

20 Claims, 6 Drawing Sheets

PRIOR ART

ROLLING SHUTTER FOR PREVENTION OF BLOOMING

CROSS REFERENCE TO RELATED APPLICATIONS

The present application is a continuation of U.S. patent application Ser. No. 11/114,094, filed Apr. 26, 2005 now U.S. Pat No. 7,619,670, the disclosure of which is incorporated by reference in its entirety.

FIELD OF THE INVENTION

The present invention relates to a rolling shutter for the prevention of blooming in a CMOS pixel cell array.

BACKGROUND OF THE INVENTION

Image sensors are used in a variety of digital image capture systems, including products such as scanners, copiers, and digital cameras. The image sensor is typically composed of an array of light-sensitive pixel cells that are electrically responsive to incident light reflected from an object or scene whose image is to be captured.

A CMOS imager includes a focal plane array of pixel cells, each cell includes a photo sensor, for example, a photo gate, photoconductor or a photodiode overlying a substrate for producing a photo-generated charge in a doped region of the substrate. In a CMOS imager, the active elements of a pixel cell, for example a four transistor (4T) pixel cell, perform the necessary functions of (1) photon to charge conversion; (2) resetting a floating diffusion region to a known state; (3) transfer of charge to the floating diffusion region; (4) selection of a pixel cell for readout; and (5) output and amplification of a signal representing a reset voltage and a pixel signal voltage based on the photo-converted charges. The charge at the floating diffusion region is converted to a pixel or reset output voltage by a source follower output transistor.

Exemplary CMOS imaging circuits, processing steps thereof, and detailed descriptions of the functions of various CMOS elements of an imaging circuit are described, for example, in U.S. Pat. Nos. 6,140,630, 6,376,868, 6,310,366, 6,326,652, 6,204,524, 6,333,205, all assigned to Micron Technology, Inc. The disclosures of each of the forgoing patents are hereby incorporated by reference herein in their entirety.

Figure 1A:
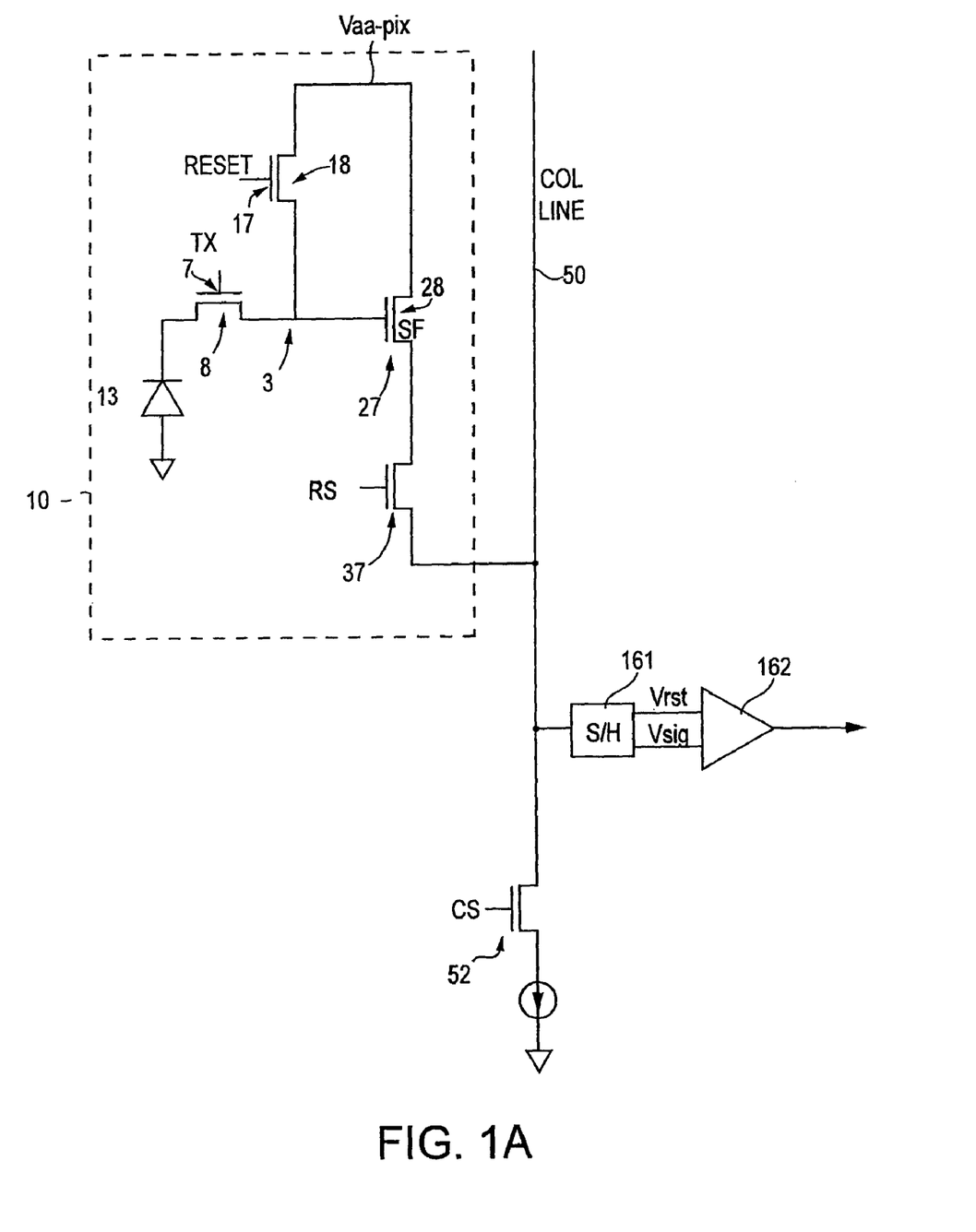
FIG. 1A is a schematic diagram of a conventional pixel cell.

A conventional CMOS four-transistor (4T) pixel cell 10 is illustrated in FIG. 1A. The illustrated cell 10 includes a pinned photodiode 13 as a photo sensor. Alternatively, the CMOS cell 10 may include a photo gate, photoconductor or other photon-to-charge converting device, in lieu of the pinned photodiode 13, as the initial accumulating area for photo-generated charge. The photodiode 13 includes a p+ surface accumulation layer and an underlying n− charge accumulation region formed in a p-type semiconductor substrate. In the exemplary pixel 10, accumulated charges are accumulated electrons.

The pixel cell 10 has a transfer gate 7, which is part of a transfer transistor 8, for transferring photo charges generated in the n− accumulation region to a floating diffusion region 3. The floating diffusion region 3 is further connected to a gate 27 of a source follower transistor 28. The source follower transistor 28 provides an output signal to a row select transistor 38 having a gate 37 for selectively gating the output signal to a column line 50. The column line 50 is selected for readout by a column select transistor 52, which applies a current source 54 to column line 50. A reset transistor 18 having a gate 17 resets the floating diffusion region 3 to a specified charge level by connecting it to a supply voltage $V_{aa\text{-}pix}$ before each charge transfer from the n− accumulation region of the photodiode 13.

Figure 1B:
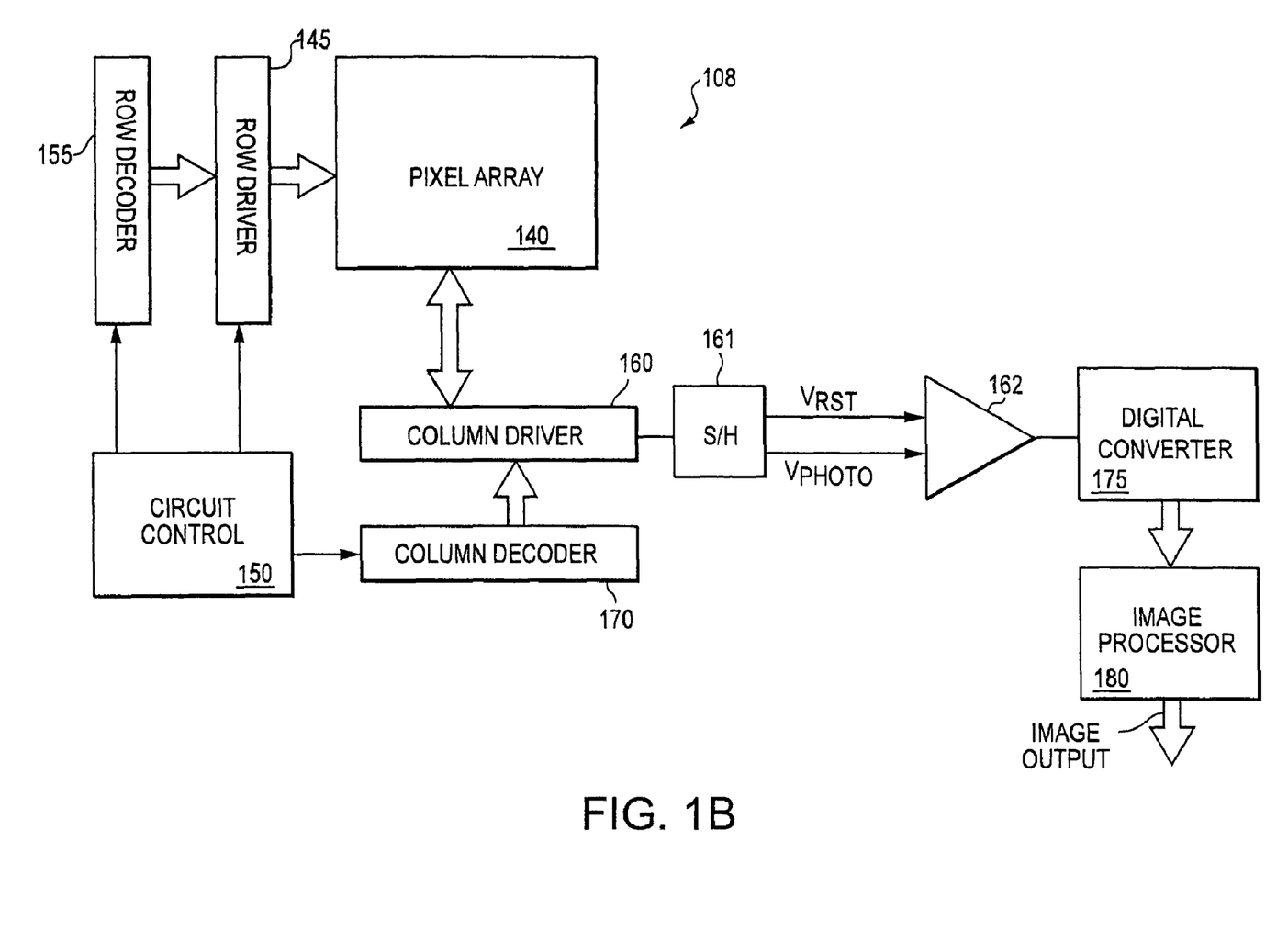
FIG. 1B depicts a block diagram of an imager device which can employ the invention.

FIG. 1B illustrates a block diagram of an exemplary CMOS imager 108 having a pixel array 140 comprising a plurality of pixel cells arranged in a predetermined number of columns and rows, with each pixel cell being constructed as illustrated and described above with respect to FIG. 1A or using other known pixel architectures. Attached to the array 140 is signal processing circuitry for controlling the pixel array 140, as described herein, at least part of which may be formed in the substrate. The pixel cells of each row in array 140 are all turned on at the same time by a row select line, and the pixel cells of each column are selectively output by respective column select lines. A plurality of TX, read, row select and column select lines are provided for the entire array 140. The row lines are selectively activated by a row driver 145 in response to row address decoder 155. The column select lines are selectively activated by a column driver 160 in response to column address decoder 170. Thus, a row and column address is provided for each pixel cell.

The CMOS imager 108 is operated by a timing and control circuit 150, which controls address decoders 155, 170 for selecting the appropriate row and column lines for pixel readout. The control circuit 150 also controls the row and column driver circuitry 145, 160 such that they apply driving voltages to the drive transistors of the selected row and column lines. The pixel column signals, which typically include a pixel reset signal $V_{rst}$ and a pixel image signal $V_{sig}$, are output to column driver 160, on output lines, and are read by a sample and hold circuit 161. $V_{rst}$ is read from a pixel cell 10 immediately after the floating diffusion region 3 is reset. $V_{sig}$ represents the amount of charges generated by the photosensitive element of the pixel cell 10 in response to applied light during an integration period. A differential signal ($V_{rst}-V_{sig}$) is produced by differential amplifier 162 for each readout pixel cell. The differential signal is digitized by an analog-to-digital converter 175 (ADC). The analog to digital converter 175 supplies the digitized pixel signals to an image processor 180, which forms and outputs a digital image.

Blooming occurs when a photodiode or other photosensitive device is overexposed, i.e., the photodiode 13 is exposed to more photons than it is capable of absorbing and converting to electrons. This is typically due to exposure of a pixel to an overly intense light source, or to exposing the pixel for too long a period of time. The excess electrons can spill over into pixels in nearby rows and columns. This overflow distorts the image, and can wash out portions of the image near the overexposed portion.

A typical technique for exposing and reading out images using pixel array 140 is by using a rolling shutter. That is, as row N is being read out, row N+X is hard reset, with X representing a number of rows further down in the array 140. A hard reset means that both the reset transistors and transfer transistors are turned on to reset the photodiode, and when the transfer transistor is turned off, an integration period begins. The time difference between a hard reset of a row and its subsequent readout is the pixel exposure time, also known as integration time.

Referring now to FIGS. 2A-2F, the operation of a conventional rolling shutter on a portion of a conventional CMOS pixel array 140 is now described. The rolling shutter, operated by control circuit 150 (FIG. 1B) includes a read row 200 and a hard reset row 201. An overexposed pixel 210 and bloom region 211 is also shown. For the purposes of this example, the integration period X of the rolling shutter is the time it takes to sequentially read out 10 rows. The integration period can be set responsive to the amount of incident light and on the capacity of the photodiodes 13 in order to prevent individual pixels from overexposing and blooming during the integration period.

Figure 2A:
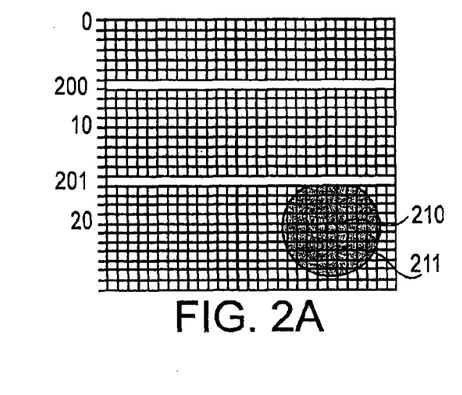
FIGS. 2A-2F show the operation of a conventional rolling shutter.

Referring now to FIG. 2A, as read row 200 (at row 6) is being read out, hard reset row 201 (at row 16) is hard reset, which then begins an integration period for row 16 where row 16 begins to collect photons until the read row 200 reaches row 16. FIGS. 2B-2F show the row by row progression of read row 200 and hard reset row 201, with the hard reset row 201 always 10 rows ahead of the read row 200. Once rows 6-15 are read out in sequence, row 16 will then be read out, and so on. This conventional rolling shutter technique does not adequately compensate for blooming, however.

Blooming can often affect pixels several rows or columns away from the initially overexposed pixel. In many cases, the adjacent pixels, which absorb a large portion of the deflected electrons from the initial overexposed pixel, can be overexposed themselves and begin to deflect electrons. Additionally, many electrons may be deflected to pixels several rows or columns away.

This blooming problem is exacerbated when, as is often the case in overexposure situations, large groups of adjacent pixels are exposed to intense light and become overexposed. The cumulative effect of the overexposed pixels can accelerate the displacement of extra electrons, overexposing and distorting pixels many rows and columns away from the initially overexposed pixels in a very short amount of time.

Conventional rolling shutters cannot fully compensate for this phenomenon. Referring again to FIGS. 2A-2F, an overexposed pixel 210 having a bloom region 211 is shown. For the purposes of this example, a single pixel 210 is exposed to light of sufficient intensity to overload the photo sensor charge accumulation region 14 (see FIG. 1A) and send excess electrons as far away as five pixels in all directions. Thus, all pixels within the bloom region 211, having a radius of approximately five pixels, will produce an inaccurate result because of the excess electrons from pixel 210.

Figure 2B:
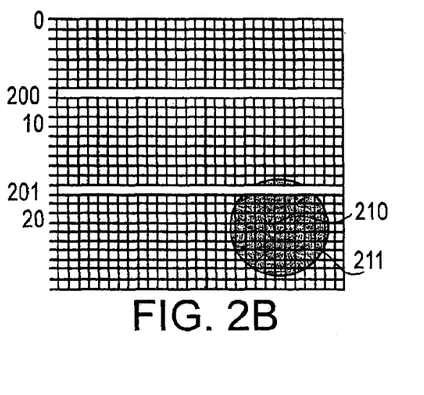
Figure 2C:
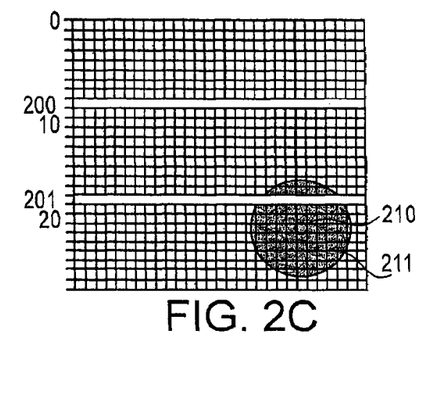
Figures 2D, 2E:
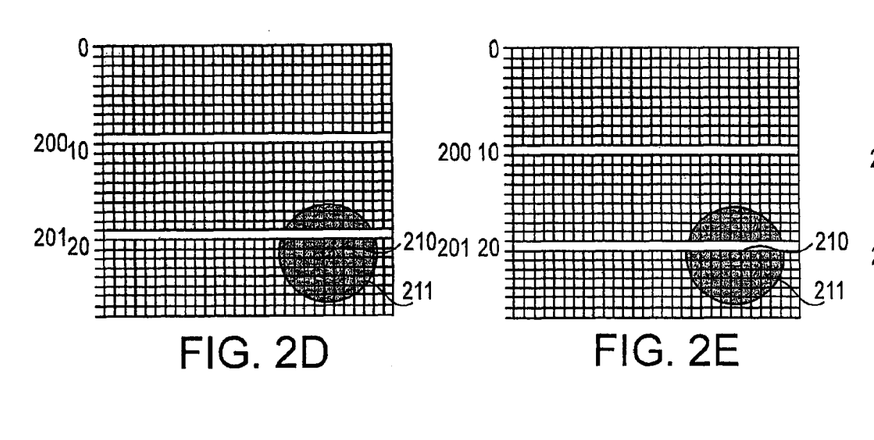

Referring again to FIG. 2A, when hard reset row 201 reaches and discharges row 16, i.e., hard resets the pixels in the row), the effects of the overexposed pixel 210 on the portion of the row in the bloom region 211 are temporarily eliminated. However, as shown in FIG. 2B, the blooming effect on a portion of row 16 can reemerge before the end of the integration period for row 16. A modern pixel array can have in excess of 1000 rows; therefore, in this example where the integration time is 10 rows, an overexposed pixel 210 can deflect electrons to nearby pixels for the time it takes to read out 990 rows, or longer. Also, because electrons can be deflected farther than the dimensions of an individual pixel, the hard resetting of row 17 will not prevent photon overflow to still integrating row 16. Also, in situations where the light is particularly intense, or where the photon capacity of a pixel cell is particularly small, the portion of row 17 in the bloom region 211 may refill and overflow to row 16 in less time than it takes to integrate one row, further distorting the portion of row 16 in the bloom region 211.

Figure 2F:
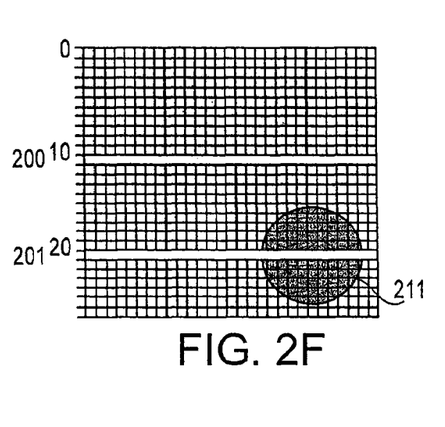

FIGS. 2C-2F show the progression of the rolling shutter and its inability to fully compensate for blooming. The hard reset row 201 must reach the overexposed pixel 210 (at row 21) to fully discharge the excess electrons by a hard reset, as shown in FIG. 2F. Before the hard reset row 201 reaches the overexposed pixel 210 at row 21, however, portions of rows 16-20 in the bloom region 211 will have already been distorted by the excess electrons which have been deflected from the pixel 210 before hard reset, as shown in FIGS. 2B-2E.

Although overexposed pixel 210 is hard reset and stops contributing to the distortion of bloom region 211, the effects of the excess electrons in bloom region 211 will remain until the row is discharged, either by being hard reset for rows 22+, or by being read out for rows 16-20, distorting the portion of the image in that portion of the bloom region 211.

There exists a need and desire for an improved rolling shutter to reduce blooming in CMOS pixel arrays caused by intense light sources and by pixel cells having small charge accumulation capacity.

BRIEF SUMMARY OF THE INVENTION

The present invention, as described in an exemplary embodiment, employs a rolling shutter technique having multiple hard reset rows that counteract the effects of blooming. The advantages are twofold. First, as the shutter progresses row-by-row down the array, each row is hard reset multiple times before the integration period begins, thereby ensuring that the row is in a true hard reset condition at the beginning of the integration period. Second, multiple leading rows are hard reset at the beginning of the integration period for a given row, thereby making it less likely that overexposed pixels several rows away will be able to distort the given row.

According to the exemplary embodiment, as row N is read out, rows N+X, . . . N+X+(Y−1) are all hard reset, with X representing the integration time, expressed in rows, of the pixel and Y representing the number of hard reset rows in the shutter. Y can be as few as 2, and it is generally sufficient that Y be between 3 and 5. However, Y can be as large as the total number of rows in the array minus X (the number of rows needed to integrate the pixel result). According to other alternate embodiments, the hard reset rows may be arranged as non-consecutive rows.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION OF THE INVENTION

Referring now to FIGS. 3A-3D, a portion of a CMOS pixel array 140 is shown. The array 140, overexposed pixel 210 and bloom region 211 have the same designations as discussed above with respect to FIGS. 2A-2F. A rolling shutter according to present invention, controlled by control circuit 150 (FIG. 1B) and having read row 300 and hard reset rows 301-305 (Y=5), is also shown. The integration time X of the rolling shutter is 10 rows, as in FIGS. 2A-2F. Thus, as each row 300 is sequentially read (designated as row N), rows 301-305 will simultaneously be hard reset (designated as rows N+X through N+X+(Y−1)).

Figure 3A:
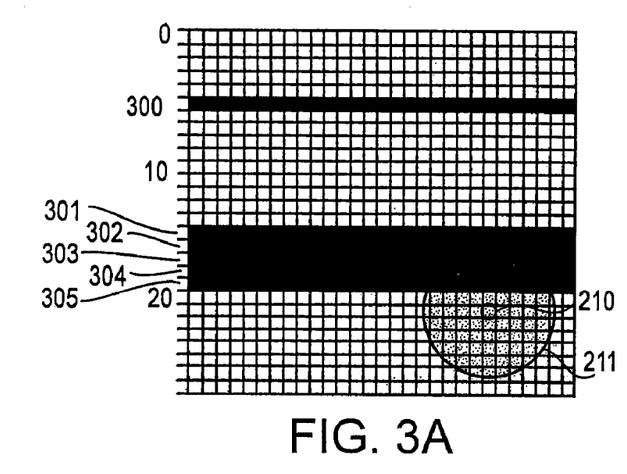
FIGS. 3A-3D show the operation of a rolling shutter according to the present invention.

Thus, referring now to FIG. 3A, as row 5 is the read row 300, rows 15-19 are hard reset. By hard resetting multiple rows, a much more significant portion of the bloom region 211 is hard reset before integration, thereby making it more difficult for the overexposed pixel to deflect or overflow electrons into rows that are still being integrated and being, or about to be read out. Here, row 5 is being read out, while rows 6-14 are still integrating.

Figure 3B:
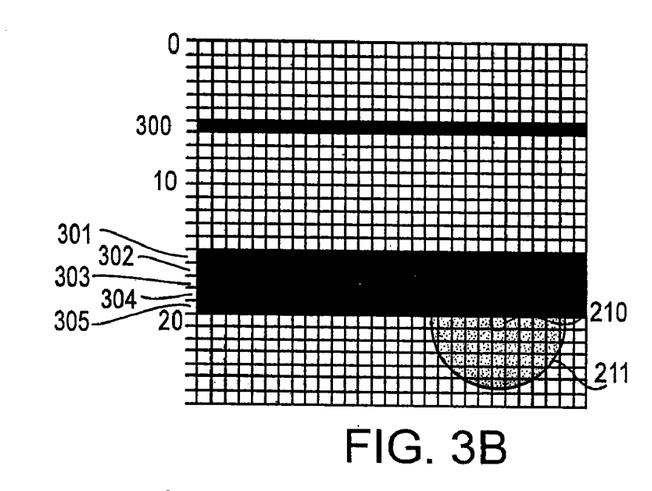

Referring now to FIG. 3B, as row 6 becomes the read row 300, rows 16-20 are hard reset. Thus, row 20 is hard reset, while rows 16-19 are hard reset again.

Figure 3C:
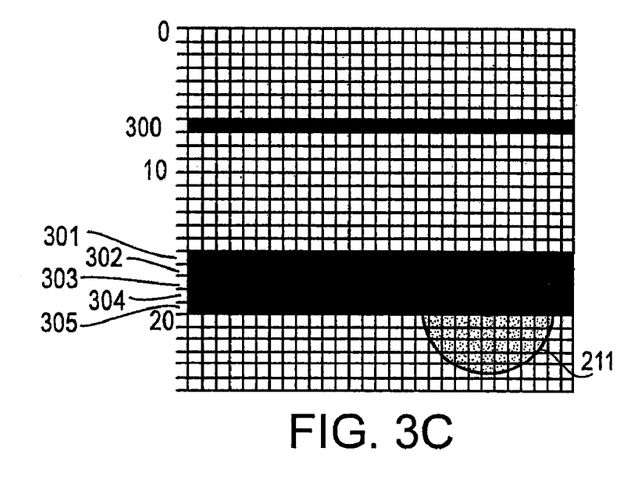
Figure 3D:
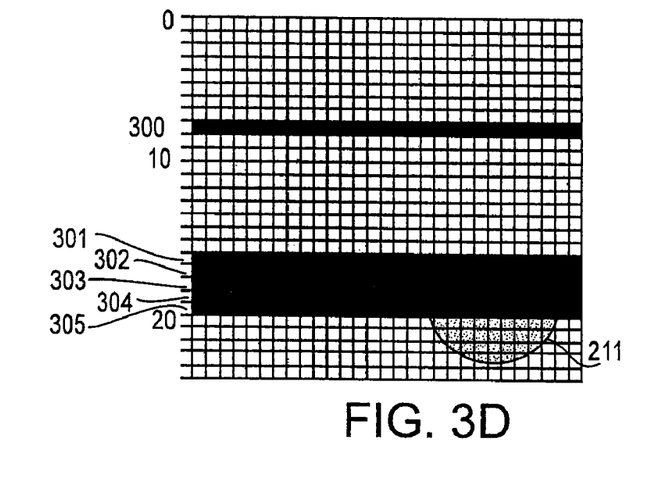

Referring now to FIG. 3C, as row 7 becomes the read row 300, rows 17-21 are hard reset. This is significant because the overexposed pixel 210, located at row 21, is now discharged. A portion of bloom region 211 (rows 22-26) remains distorted, but the row by row hard reset of these rows, beginning with row 22 in FIG. 3D, will eliminate the distortion before the integration period begins for these respective rows. For pixel 210 to become overexposed and bloom again, the pixel must be exposed to capacity in the time it takes the shutter to move down one row, when another hard reset will occur on row 210. This is highly unlikely unless the light is abnormally intense, or unless the pixel 210 has an extremely low photon capacity; in such a case, the integration period X could also be reduced to prevent blooming pixels during integration.

Referring now to FIG. 3C, as row 8 becomes the read row 300, rows 18-22, again including pixel 210 in row 21, are hard reset. Formerly overexposed pixel 210 is hard reset five times in this example, thereby preventing reemergence of overexposure and blooming in the pixel 210.

The number of hard reset rows Y in the above example is 5, but in practice, the number of hard reset rows Y may be anywhere between 2 and the total number of rows in the pixel array 140, minus the number of rows X required for integration and read out of the pixels. This number of hard reset rows Y may be set based on the blooming that is expected based on other parameters of the imager and on the amount of incident light. As the reset rows 301-305 reach the last row of the array 140, the reset rows 301-305 loop back to the first row of the array in sequence.

The invention is easily implemented in the FIG. 1B imager device 18 by controlling the row reset and transfer signals applied to the array 140 from the row decoder 155 and row driver 145 circuits under control of control circuit 150.

Figure 4:
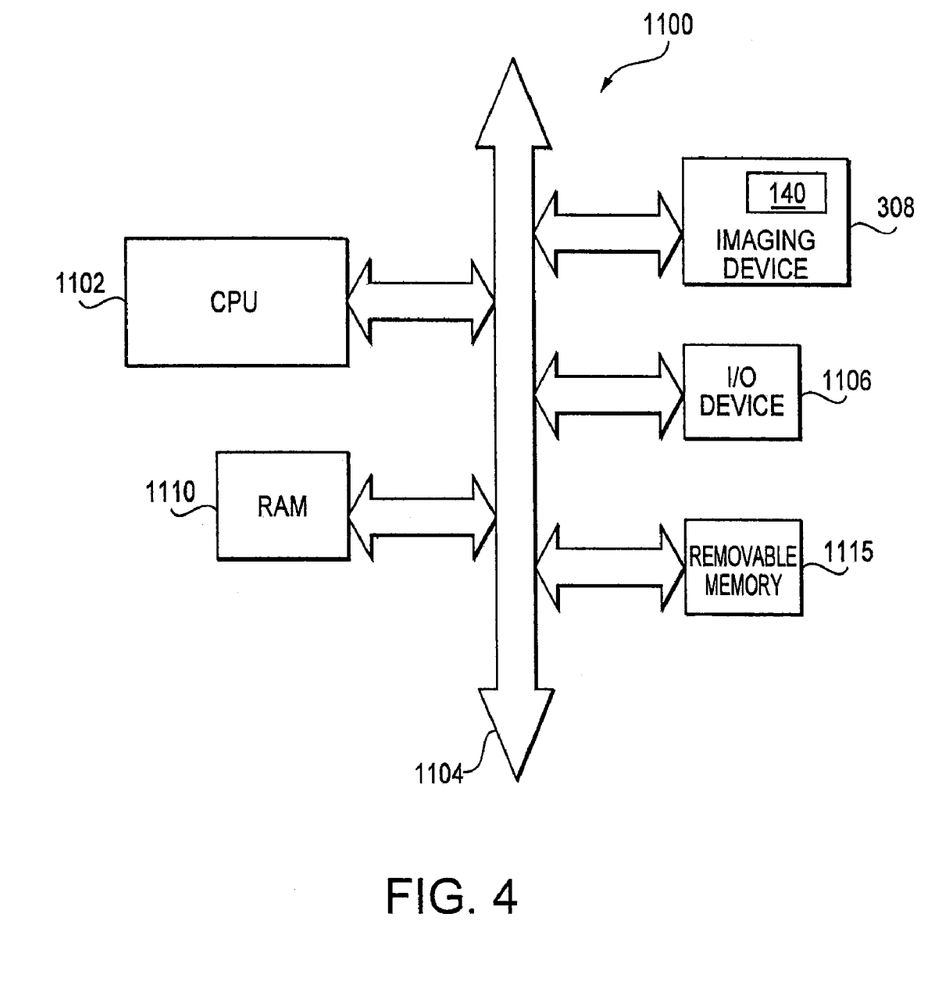
FIG. 4 shows a processor system incorporating at least one imager device constructed in accordance with an embodiment of the invention.

FIG. 4 illustrates a processor-based system 1100 including an imaging device 108, CPU 1102, RAM 1110, I/O device 1106, and removable memory 1115. The imaging device 108 contains a pixel array 140 operating under a rolling shutter constructed and operated as described herein. The processor-based system 1100 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and other image sensing and/or processing system.

The processor-based system 1100, for example a camera system, generally comprises a central processing unit (CPU) 1102, such as a microprocessor, that communicates with an input/output (I/O) device 1106 over a bus 1104. Imaging device 308 also communicates with the CPU 1102 over the bus 1104. The processor-based system 1100 also includes random access memory (RAM) 1110, and can include removable memory 1115, such as flash memory, which also communicates with CPU 1102 over the bus 1104. Imaging device 308 may be combined with a processor, such as a CPU, digital signal processor, or microprocessor, with or without memory storage on a single integrated circuit or on a different chip than the processor. Any of the memory storage devices in the processor-based system 1100 could store software for employing the above-described method.

Figure 5:
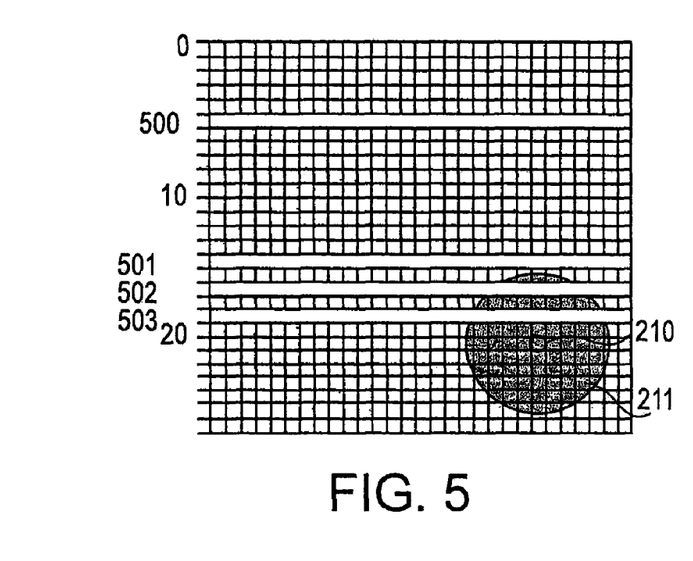
FIG. 5 shows the arrangement of a rolling shutter according to an alternate embodiment of the present invention.
Figure 6:
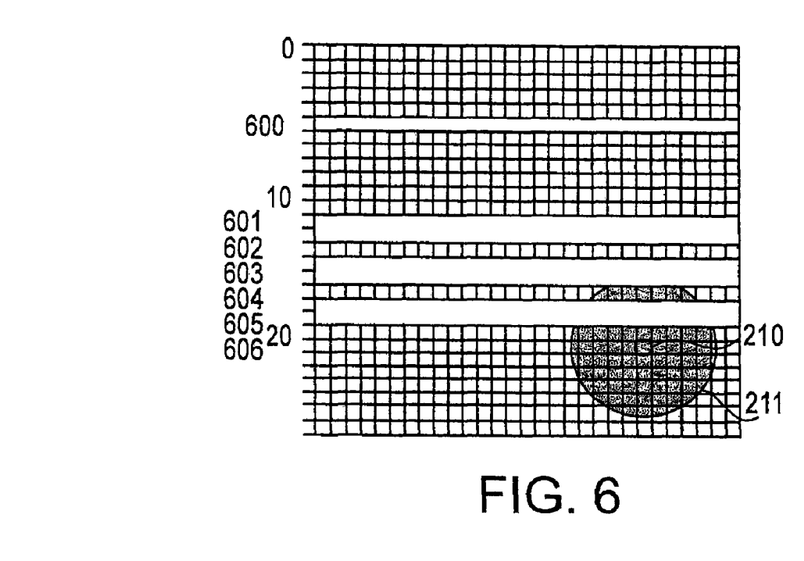
FIG. 6 shows the arrangement of a rolling shutter according to another alternate embodiment of the present invention.

Referring now to FIGS. 5 and 6, alternate embodiments of the rolling shutter technique according to the present invention are shown. These alternate embodiments show other possible arrangements of hard reset rows, in which the reset rows are arranged non-consecutively. FIG. 5 shows a rolling shutter technique comprising a read row 500 (at row 6 of the array 140) and three individual hard reset rows 501-503 arranged in alternate sequential rows (respective rows 15, 17 and 19) down the array 140. FIG. 6 shows a rolling shutter technique comprising a read out row 600 (at row 6 of the array 140) and three pairs of hard reset rows 601-606 at respective rows 12, 13, 15, 16, 18 and 19 of the array 140, each pair of reset rows being separated by a single row of pixels (respective rows 14 and 17) down the array 140. These and other arrangements of read and hard reset rows can be modified as circumstances dictate.

The above description and drawings are only to be considered illustrative of exemplary embodiments which achieve the features and advantages of the invention. Modification of, and substitutions to, specific process conditions and structures can be made without departing from the spirit and scope of the invention. Accordingly, the invention is not to be considered as being limited by the foregoing description and drawings, but is only limited by the scope of the appended claims.

What is claimed as new and desired to be protected by Letters Patent of the United States is:

1. An imaging device comprising:
 a pixel array arranged in rows and columns; and
 a control circuit operable to implement a rolling shutter operation, the operation comprising:
 sequentially reading out a selected row of the pixel array; and
 after each sequential read out, simultaneously hard resetting, from a non-reset state, a plurality of rows of said pixel array ahead of the selected row.

2. The imaging device of claim 1, wherein the readout sequence comprises reading out all rows of the pixel array consecutively.

3. The imaging device of claim 1, wherein the readout sequence comprises simultaneously hard resetting at least two consecutive rows of the pixel array.

4. The imaging device of claim 1, wherein the readout sequence comprises simultaneously hard resetting a plurality of spaced apart rows of the pixel array.

5. The imaging device of claim 1, wherein the readout sequence comprises simultaneously hard resetting at least two spaced apart pluralities of consecutive rows of the pixel array.

6. The imaging device of claim 5, wherein the at least two pluralities of consecutive rows are spaced apart from one another by a single row.

7. The imaging device of claim 1, wherein the plurality of rows being simultaneously reset in the readout sequence are located ahead of the row being read out by a number of rows of pixels corresponding to an integration time.

8. A method of operating a rolling shutter on a pixel array arranged in rows and columns, said method comprising:

sequentially reading out a selected row of the pixel array; and after each sequential read out, simultaneously hard resetting, from a non-reset state, a plurality of rows of said pixel array ahead of the selected row.

9. The method of claim 8, wherein the readout sequence comprises reading out all rows of the pixel array consecutively.

10. The method of claim 8, wherein the readout sequence comprises simultaneously hard resetting at least two consecutive rows of the pixel array.

11. The method of claim 8, wherein the readout sequence comprises simultaneously hard resetting at least five consecutive rows of the pixel array.

12. The method of claim 8, wherein the readout sequence comprises simultaneously hard resetting a plurality of spaced apart rows of the pixel array.

13. The method of claim 8, wherein the readout sequence comprises simultaneously hard resetting at least two spaced apart pluralities of consecutive rows of the pixel array.

14. The method of claim 8, wherein the plurality of rows being simultaneously reset are ahead of the row being read out by a number of rows of pixels corresponding to an integration time.

15. An imaging system comprising:
a processor;
a pixel array arranged in rows and columns; and
a control circuit connected to the processor and operable to implement a rolling shutter to hard reset each row in the pixel array multiple times before an integration period for that row begins, a plurality of rows ahead of a row selected for readout being hard reset simultaneously with readout of the selected row.

16. The imaging system of claim 15, wherein the readout sequence comprises reading out each of the rows of the pixel array consecutively.

17. The imaging system of claim 15, wherein the plurality of rows includes at least two consecutive rows.

18. The imaging system of claim 15, wherein the plurality of rows includes at least a plurality of spaced apart rows.

19. The imaging system of claim 15, wherein the plurality of rows includes at least two spaced apart pluralities of consecutive rows of the pixel array.

20. The imaging system of claim 15, wherein the plurality of rows being simultaneously reset are ahead of the row selected for read out by a number of rows of pixels corresponding to a length of the integration period.

* * * * *